United States Patent [19]

Falzone et al.

[11] Patent Number: 4,997,227
[45] Date of Patent: Mar. 5, 1991

[54] TRUCK LINER

[76] Inventors: Thomas C. Falzone; Margaret J. Jackson, both of 1331 Amhurst Ave., Apt. 12, Los Angeles, Calif.

[21] Appl. No.: 360,281
[22] Filed: Jun. 2, 1989
[51] Int. Cl.⁵ .............................................. B60R 27/00
[52] U.S. Cl. .................................. 296/39.2; 296/37.6; 280/770; 150/166
[58] Field of Search ................ 296/39.2, 98, 37.6, 296/136, 153, 159, 100; 280/770, 850, 847; 150/166; 141/97; 248/359; 224/42.42, 091, 278, 42.01, 42.11, 42.31, 5

[56] References Cited

U.S. PATENT DOCUMENTS

| 271,009 | 10/1883 | Fishler | 296/39.2 X |
|---|---|---|---|
| 601,976 | 4/1898 | Murray | 296/39.1 |
| 2,460,394 | 2/1949 | Peatross | 280/770 |
| 2,979,190 | 4/1961 | Daigle | 280/850 X |
| 3,146,824 | 9/1964 | Veilleux | 296/98 |
| 3,563,594 | 2/1971 | London | 296/98 X |
| 3,986,749 | 10/1976 | Hull et al. | 296/98 X |
| 4,279,439 | 7/1981 | Cantieri | 296/39.2 |
| 4,531,560 | 7/1985 | Balanky | 296/136 X |
| 4,607,876 | 8/1986 | Reed | 296/100 |
| 4,705,317 | 11/1987 | Henri | 296/37.6 |
| 4,707,016 | 11/1987 | McDonald | 296/39.2 |
| 4,789,195 | 12/1988 | Fletcher | 296/37.6 X |
| 4,884,824 | 12/1989 | Raoke | 280/770 |

Primary Examiner—Dennis H. Pedder
Attorney, Agent, or Firm—Spensley Horn Jubas & Lubitz

[57] ABSTRACT

A truck bed liner having a flexible protective flap supported by a frame mounted on the bed of a pickup truck. The flap is movable between a first stowed position within the bed of the truck and a second extended position in which the flap may be draped over at least a portion of the exterior surface of the truck bed.

6 Claims, 2 Drawing Sheets

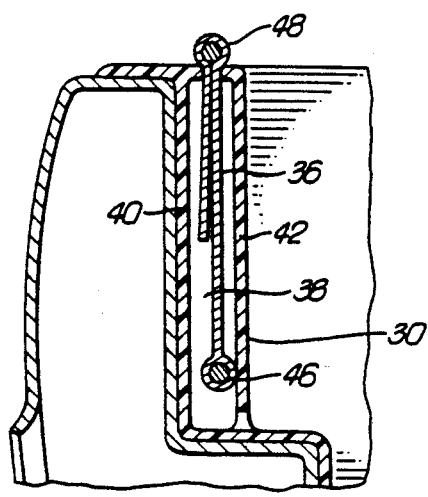
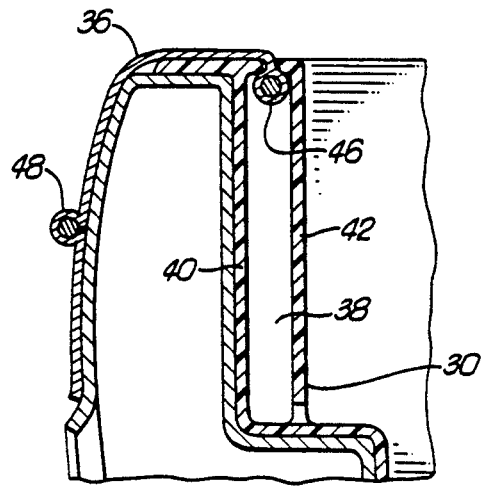
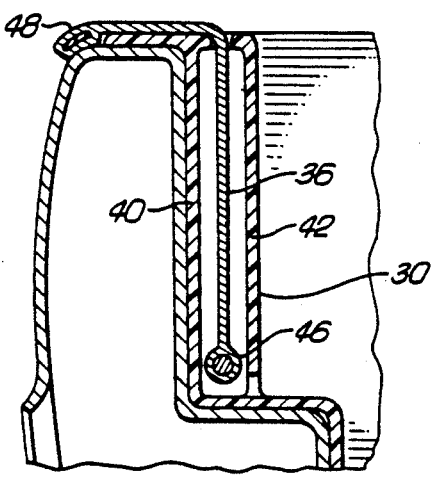
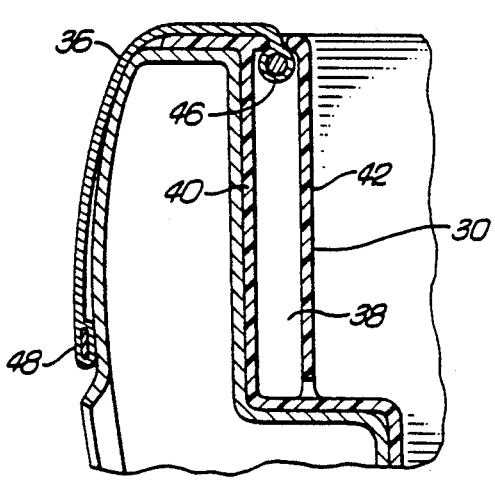
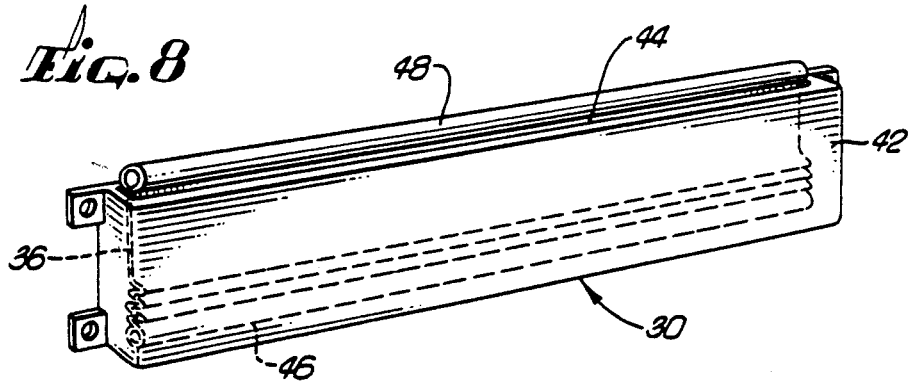

TRUCK LINER

BACKGROUND OF THE INVENTION

1. Field of the Invention

This invention relates to pickup trucks, and more particularly to liners for pickup truck beds.

2. Description of Related Art

Pickup trucks are considered by many to be particularly desirable and useful because the bed can be used to carry heavy or cumbersome loads and transport materials which may damage other vehicles. The relatively open structure of pickup truck beds also allows bulky or extremely long objects to be carried by placing a portion of the object within the bed and allowing the object to extend beyond the bed, frequently resting on the top of the sidewalls or tailgate. Further, pickups are particularly convenient because the bed is readily accessible and can, in many instances, be loaded and unloaded directly over the side walls of the bed.

However, the use of pickup trucks in this manner frequently results in damage to the truck bed. For example, during transport the load may shift and dent or mar the interior or top of the bed. Similarly, when loading an object over the sidewalls or tailgate, the object may inadvertently strike the exterior of the truck bed resulting in unsightly marring of the truck bed.

To reduce truck bed damage, bed liners which cover the bottom and the interior walls of the bed have been used. However, these liners typically provide only minimal protection to the top surfaces of the walls and tailgate and often provide virtually no protection to the exterior surfaces of the walls and tailgate.

SUMMARY OF THE INVENTION

Accordingly, it is an object of the present invention to provide an improved truck bed liner which protects the top and exterior surfaces of the walls of a pickup truck bed.

A further object of the invention is to provide an improved truck bed liner which is easy to install, simple to use, inexpensive to manufacture, and does not detract from the general appearance of the pickup truck once installed.

In accordance with these and other objects, a preferred embodiment of the present invention comprises a frame attachable to the interior of a vertical wall of a truck bed. The frame supports a flexible flap which is movable between a first position in which the majority of the flap is within the truck bed and a second position in which a majority of the flap is extended from the truck bed. In the second position the flap can be draped over at least a portion of the top and exterior surface of the vertical wall to provide a protective covering.

Other objects and aspects of the invention will become apparent to those skilled in the art from the detailed description of the invention which is presented by way of example and not as a limitation of the present invention.

BRIEF DESCRIPTION OF THE DRAWINGS

FIG. 4 is a cross sectional view of another embodiment of the present invention showing the flap in its stowed position.

FIG. 5 is a cross sectional view of the embodiment of FIG. 4 showing the flap in its extended position.

FIG. 6 is a cross sectional view of yet another embodiment of the present invention showing the flap in its stowed position.

FIG. 7 is a cross sectional view of the embodiment of FIG. 6 showing the flap in its extended position.

FIG. 8 is an elevated perspective view of a truck liner in accordance with another embodiment of the invention.

DESCRIPTION OF THE ILLUSTRATED EMBODIMENT

Figure 1:
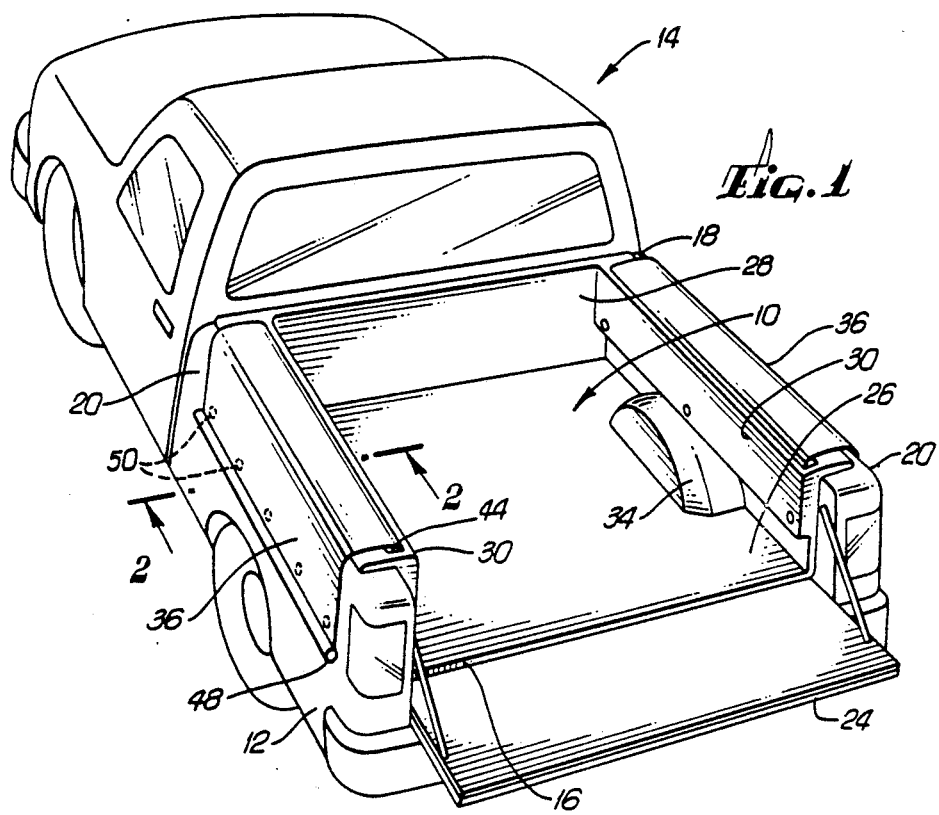
FIG. 1 is an elevated perspective view of a truck bed liner in accordance with a preferred embodiment of the present invention.

A truck bed liner in accordance with a preferred embodiment of the present invention is indicated in the drawings generally at 10. In FIG. 1, the truck bed liner 10 is shown within a bed 12 of a pickup truck 14. The bed 12 includes a bottom 16, a front wall 18, two side walls 20, and a pivoting tailgate 24 which serves as the back wall when in an upright position. The illustrated truck bed liner has a bottom panel 26, a front panel 28, and two side panels 30 corresponding generally to the interior shape of the truck bed. The panels 26, 28, and 30, are of the same general dimensions as the interior surfaces of the truck bed and are positioned adjacent to the bottom 16, the front wall 18, and the side walls 20, respectively.

In this manner, the panels provide a protective covering for the interior surfaces of the truck bed 12. As can be appreciated by those skilled in the art, the panels should be made from a durable material which can absorb the shock of shifting loads and withstand the elements. For example, the panels 26, 28, and 30 may be made of vacuum formed polyethylene. In the illustrated embodiment the panels are shown formed in a single piece. When formed in this fashion, the panels provide support for one another and the unit can be readily installed in the truck bed 12. However, the panels could also be individually formed and connected to one another or individually formed and attached directly to the truck bed without being interconnected. If necessary, the panels may be provided with contours 34 to conform to wheel wells or any other irregularities in the truck bed.

Figure 3:
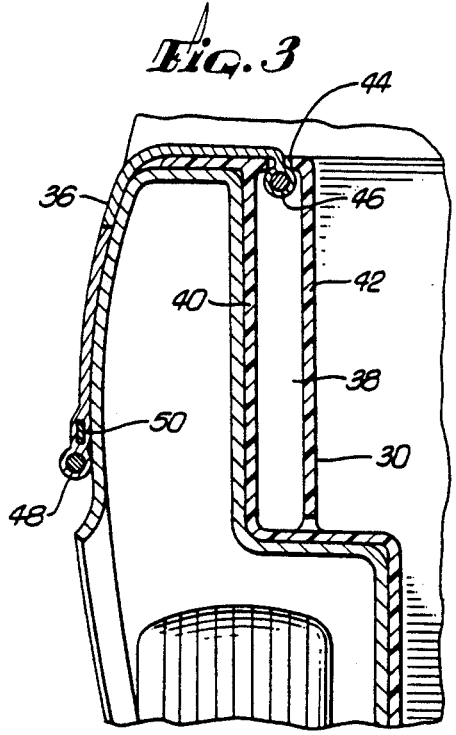
FIG. 3 is a cross sectional view of the embodiment of FIG. 1 taken along line 2—2 showing the flap in its extended position.
Figure 2:
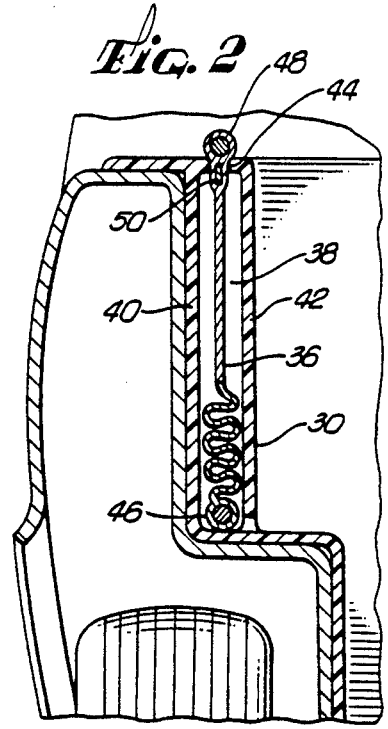
FIG. 2 is a cross sectional view of the embodiment of FIG. 1 taken along line 2—2 showing the flap in its stowed position.

As previously mentioned, one problem with many prior bed liners is that they do not adequately protect outside surfaces of the bed. Accordingly, in one aspect of the invention, the inventive liner 10 is provided with flaps 36 to protect outside surfaces of the truck bed 12. As illustrated in FIGS. 2 and 3, the flaps 36 are movable between a first stowed position and a second extended position. In the extended position the flaps 36 can be draped over at least a portion of the top and exterior of a wall of the truck bed. In this manner, each flap provides a protective barrier to prevent damage and marring of the top and exterior surfaces of the truck bed.

In the illustrated embodiments, each flap is supported in a frame integrally formed in a truck bed liner which protects the interior of the truck bed and includes a chamber 38 in which the flap is conveniently stored while in the stowed position. However, it should be appreciated that a variety of supportive frames could be used so long as the protective flap is movable to a position in which it extends over at least a portion of the top and exterior surfaces of the truck bed. Further, it is not necessary for a chamber to be provided for receiving the flap in the stowed position. Rather, the protective flap could be placed within the truck bed or stowed in any other convenient manner.

In the stowed position of the embodiment of FIG. 2, the majority of the flap is stowed within chamber 38 provided in the side panel 30. In the illustrated embodiment, the side panel 30 has an inner wall 40 and an outer wall 42. The walls 40 and 42 are maintained separate from one another to form the chamber 38. This double walled construction also contributes to the strength and rigidity of the side panel 30. If desired, rigidity can be further increased by providing reinforcement or raised ribs (not shown) along the side panel 30. Although the double walled construction, and hence the chamber 38, is shown extending down only a portion of the side panel 30, it should be understood that the double walls 40 and 42 could extend along the entire height of side panel 30 if desired.

In many cases it may be desireable to form walls 40 and 42 separately and join them to form the double walled panel. This can be done so as to allow separation of the walls and provide access to the interior of chamber 38 for maintenance purposes. Similarly, the chamber 38 may be provided with holes at its lower extreme to allow moisture to drain from the chamber. Further, it should be appreciated that the chamber 38 may be formed by some means other than double wall construction of the side panel. For example, a single walled side panel could be spaced from the side wall 20 such that the chamber 38 is defined by the interior surface of side wall 20 and side panel 30.

Chamber 38 is provided with an opening 44 along the top of side panel 30 through which the flap 36 extends. The width of the opening 44 is sized to allow free movement of the flap 36 through the opening 44. However, the width of the opening is less than the width of the chamber 38. The bottom of flap 36 is provided with a stopper 46 which is a dowel encased in the flap in the illustrated embodiment. The dowel 46 is thinner than the width of chamber 38 but is wider than the width of opening 44. In this manner, the stopper 46 and the flap 36 are freely movable within chamber 38, and the flap can be extended from the chamber 38 through the opening 44. However, because the stopper 46 is wider than the width of the opening 44 the bottom of the flap 36 is securely retained within the chamber 38 so that the flap 36 cannot be completely withdrawn from the chamber 38.

In the extended position, illustrated in FIG. 3, the majority of the flap 36 is outside the chamber 38 and can be draped over the top and exterior surface of side wall 20 to form a protective layer. As can be appreciated, the flap 36 is made from a material, such as rubber with a cloth backing or plastic, which is flexible enough to allow the flap 36 to be draped over the side wall 20 of the bed 12 and still provide a protective layer over the exterior of the side wall 20. The flap 36 is provided with an upper stopper 48 which prevents the top of the flap from entering the chamber 38. In the embodiment of FIGS. 2 and 3, the upper stopper 48 is a dowel attached to the top edge of flap 36. The upper stopper 48 can also serve as a gripping surface to facilitate movement of the flap 36 between the stowed and extended positions.

To move the flap 36 from the stowed position to the extended position, the user merely grasps the upper stopper 48, raises the flap 36 as far as the lower stopper will allow, and drapes the extended flap 36 over the exterior surface of the side wall 20. Although the weight of the upper stopper 48 will tend to hold the flap 36 against the surface of the truck, magnets 50 may be attached to the flap to hold it firmly against the side wall 20. The use of magnets or similar devices to maintain the flap firmly against the surface of the truck allow the truck to be driven with the flap in the extended position. The magnets may be sewn onto the flap, molded into the flap, or attached in any other manner known to those skilled in the art. Preferably, the magnets are of a type which, when attached to the flap, will not scratch or otherwise damage the finish of the truck bed.

To move flap 36 from the extended position to the stowed position the user can grasp the upper stopper 48, raise the flap 36 above the side wall 20, and lower the flap 36 into the chamber until the upper stopper 48 rests against the side panel 30. The lower stopper 46 assists in this procedure because its weight helps pull the flap 36 to the bottom of chamber 38.

In order to provide an increased area of protection when the flap is extended, it may be desirable for the length of flap 36 to be greater than the depth of chamber 38. In the embodiment of FIG. 2 this requires that the lower portion of the flap 36 fold or crinkle in order to allow the chamber 38 to accommodate the entire flap 36. This can be facilitated by forming the flap from two different materials; a lower portion made of a thin flexible material which accommodates folding, and an upper portion of thicker more protective material. This does not compromise the effectiveness of the inventive liner because the thin material overlaps that portion of the top of the side wall 20 which is covered by an overhanging lip formed on the top of side panel 30.

The flap may be provided with several features which make it adaptable for use in with truck beds having a wide variety of configurations and accessories. For example, if the exterior of the truck bed is provided with hooks, tie downs, or similar features, apertures can be provided in the protective flap to allow access to such features. Similarly, many truck beds contain tool boxes or other storage devices which are permanently or semi-permanently mounted within the bed. To provide protection around these and similar devices, the protective flap may be provided with a section which folds out to conform to the geometry of each particular situation. Living hinges can be provided in the flap to facilitate folding and unfolding of these sections.

In the embodiment of FIGS. 4 and 5 the upper stopper 48 is located a short distance from the top edge of flap 36. In this configuration the flap 36 can be folded along the upper stopper 48 and the top edge of the flap 36 inserted into the chamber 38 in the stowed position. This allows the chamber 38 to accommodate a flap having a length greater than the height of the chamber without the necessity of crinkling or layering the flap. Thus, there is no need for a portion of thin flexible material at the bottom of the flap.

In a similar embodiment, not shown, the bottom of the flap may be fixed to the frame near the top opening. In this embodiment, the flap can be folded back on itself as it is placed into the stowed position. This allows the length of the flap to be approximately twice the depth of the chamber and allows for protective material to be used for the entire length of the flap. If necessary, the flap can be provided with a living hinge to facilitate placement in the stowed position.

In the embodiment shown in FIGS. 6 and 7 the top edge of the flap is folded back on itself to create a thick region which serves as the upper stopper 48. When in the stowed position, the upper stopper is not placed adjacent the opening. Rather, the uppermost portion of the flap remains extended from the chamber. To prevent the extended portion from flapping, a releasable fastener, such as a hook and pile fastener or snaps can be provided.

In the embodiment of FIG. 8, the side panel 30 is formed as an independent unit. In this manner, the side panel can be attached to an existing bed liner or it can be attached directly to a wall of a truck bed without a bed liner. The panel of FIG. 8 can also be attached to a tailgate.

Because the protective flap is movable between the stowed and extended positions, the flap can be extended to form a protective barrier when loading, unloading, leaning objects against the bed, or any other time the outer surface of the bed may be subject to marring. Further, the flap can be stowed in an unobtrusive manner which does not impair the visual appeal of the truck when protection is unnecessary. In some instances it might also be desirable to provide advertising or identification information on the flap which can be displayed when in the extended position.

This detailed description is set forth only for purposes of illustrating as example of the present invention and should not be considered to limit the scope thereof in any way. Clearly, numerous additions, substitutions, and other modifications can be made to the invention without departing from the scope of the invention which is defined in the appended claims.

What is claimed is:

1. A protector for a pickup truck bed having at least one vertical wall comprising:
    a panel attachable to the interior of a vertical wall of a pickup truck bed to define a chamber, said chamber situated substantially within said pickup truck bed and having an opening near the top of said vertical wall; and
    a flexible flap extending through said opening, said flap being movable between a first position in which the majority of said flap is within said chamber and a second position in which the majority of said flap is outside said chamber.

2. The pickup truck bed protector of claim 1 wherein said flap is provided with a lower stopper means for maintaining a portion of the flap within the chamber and an upper stopper means for maintaining a portion of the flap outside the chamber.

3. A protector for a pickup truck bed having at least one vertical wall comprising:
    a rigid double walled panel, the walls of said panel defining a chamber having a longitudinal opening along the top edge of said panel;
    a flexible flap extending through said opening, said flap being movable between a first position in which the majority of the flap is within the chamber and a second position in which the majority of the flap is outside said chamber, wherein said panel may be positioned adjacent the interior of a vertical wall of a pickup truck bed such that the flap in the second position can be draped over at least a portion of an external surface of the vertical wall of the pickup truck bed.

4. The pickup truck bed protector of claim 3 wherein said flap has a lower stopper means for maintaining a portion of the flap within the chamber and an upper stopper means for maintaining a portion of the flap outside the chamber.

5. The pickup truck bed protector of claim 4 wherein the flap has magnets attached thereto to removably attach the flap to the exterior wall of the vertical wall of the pickup truck bed while in the second position.

6. A pickup truck bed protector comprising:
    a bed liner having a bottom, a front, and two side panels conforming to the interior of a pickup truck bed, each side panel having double walls defining a chamber therein, each chamber having an opening extending lengthwise along the top of said side panel; and
    a flexible flap extending through said opening, said flap being movable between a first position in which the majority of the flap is within the chamber and a second position in which the majority of the flap is outside the chamber, said flap being provided with lower stopper means for maintaining the lower portion of the flap within the chamber in said second position and an upper stopper means for maintaining the top of said flap outside the chamber in said first position.

* * * * *